United States Patent [19]

Keating

[11] Patent Number: 4,697,504
[45] Date of Patent: Oct. 6, 1987

[54] HINGED TOP GRILL ARRANGMENT

[76] Inventor: Richard Keating, 715 S. 25th Ave., Bellwood, Ill. 60104

[21] Appl. No.: 806,092

[22] Filed: Dec. 6, 1985

[51] Int. Cl.⁴ ............................................. A47J 27/62
[52] U.S. Cl. .................................. 99/331; 126/41 R; 99/379; 99/349
[58] Field of Search ................. 99/377, 379, 372, 349, 99/331; 126/41 R; 248/280.1, 292.1; 92/118

[56] References Cited

U.S. PATENT DOCUMENTS

| | | | |
|---|---|---|---|
| 992,417 | 5/1911 | Gale | 99/379 |
| 2,644,880 | 7/1953 | Valentini et al. | 99/372 |
| 2,719,903 | 10/1955 | Oertli | 99/372 |
| 2,922,357 | 1/1960 | D'Arcey et al. | 99/379 |
| 3,312,161 | 4/1967 | Nanna | 99/372 |
| 4,150,609 | 4/1979 | McClean | 99/372 |
| 4,165,682 | 8/1979 | Weiss | 99/372 |
| 4,483,239 | 11/1984 | Mueller | 99/349 |

FOREIGN PATENT DOCUMENTS 358300 12/1972 U.S.S.R. ............................... 126/20

Primary Examiner—James C. Yeung
Attorney, Agent, or Firm—Nicholas A. Camasto

[57] ABSTRACT

A top grill assembly for use with a conventional grill apparatus includes a J-shaped support bracket for mounting over the back of a grill enclosure and a generally elongated U-shaped supporting handle having legs pivotally mounted on the support bracket. A top grill is pivotally supported from the supporting handle near its front and captivated thereto near its rear to permit a limited range of angular movement with respect to the supporting handle. A pressurized gas cylinder is positioned between the support bracket and a cross member joining the supporting handle legs for counterbalancing the weight of the top grill. The gas cylinder may be attached to a bracket in a plurality of positions for varying the pressure applied by the top grill when lowered into the cooking position. A thermostat housing is mounted to the cross member and a cord guide maintains the electrical cord in a safe orientation.

3 Claims, 7 Drawing Figures

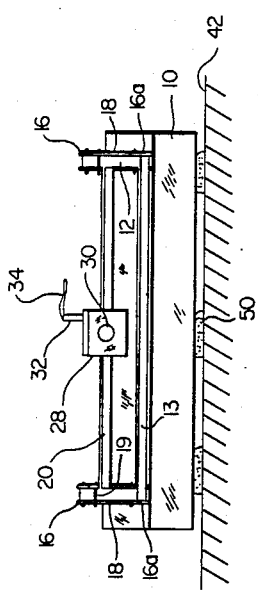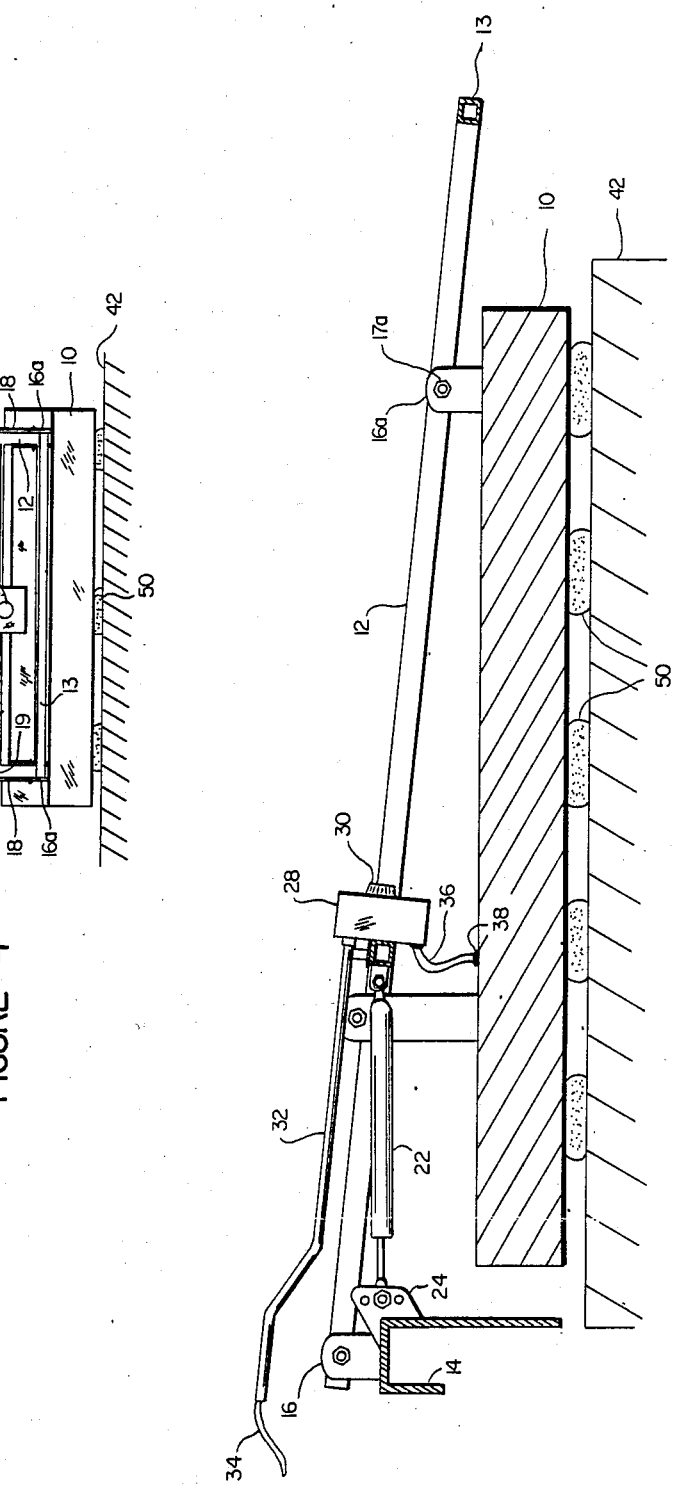

HINGED TOP GRILL ARRANGMENT

BACKGROUND OF THE INVENTION

This invention is directed generally to grill type cooking apparatus and particularly to simplified apparatus for converting such equipment to a grill press, that is cooking apparatus having both an upper and a lower grill surface.

In restaurants generally, and in so called fast food establishments particularly, many foods are cooked directly from a frozen state. Cooking such foods as frozen hamburger patties and frozen sausage patties requires a significant amount of time and also necesitates turning the food patties over during the cooking period. So called "clam shell" or grill press type grills are known in the art for simultaneously cooking such food on both sides. With frozen foods especially, the cooking is extremely rapid, resulting in time savings from 50%-80%. Consequently their use in fast food restaurants is highly desirable.

There are available top grill assemblies for use with commercial single grill cooking apparatus. Since the top grill assembly includes a heavy metal cooking surface that must be cantilevered so as to be openable by the operator during the cooking process, heavy counter balancing springs or weights are incorporated. The top grill mechanism must also be custom installed, by modifying the conventional single grill cooking apparatus with which it is to be used. In the prior art, these modifications have taken the form of cutting out portions of the sheet metal of the existing cooking apparatus and welding the top grill assembly thereto. Such prior art top grill assemblies also suffer from other disadvantages. For example, they are not easily adjustable to change the pressure they apply to the food being cooked and they do not adapt to variations in thickness of foods on the grill.

The top grill assembly of the invention is readily installed on conventional cooking apparatus without the use of tools, is easily adjustable in terms of the pressure it applies to food being cooked and automatically adjusts for differences between thickness of foods on the front and rear portions of the grill surface.

OBJECTS OF THE INVENTION

The principal object of the invention is to provide an improved top grill assembly.

Another object of the invention is to provide a top grill assembly that may be installed on a conventional grill apparatus without the use of tools.

A further object of the invention is to provide a top grill assembly that automatically adjusts for different thicknesses of foodstuffs.

A still further object of the invention is to provide a top grill assembly for a cooking apparatus that is readily adjustable for changing the pressure exerted on foods being cooked.

BRIEF DESCRIPTION OF THE DRAWINGS

These and other objects of the invention will be apparent upon reading the following description in conjunction with the drawings in which:

FIG. 3 is an enlarged side elevation view, partially sectioned, to further illustrate the construction of the top grill assembly of the invention;

FIG. 4 is a partial front view of the top grill assembly;

DESCRIPTION OF THE PREFERRED EMBODIMENT

Figure 1:
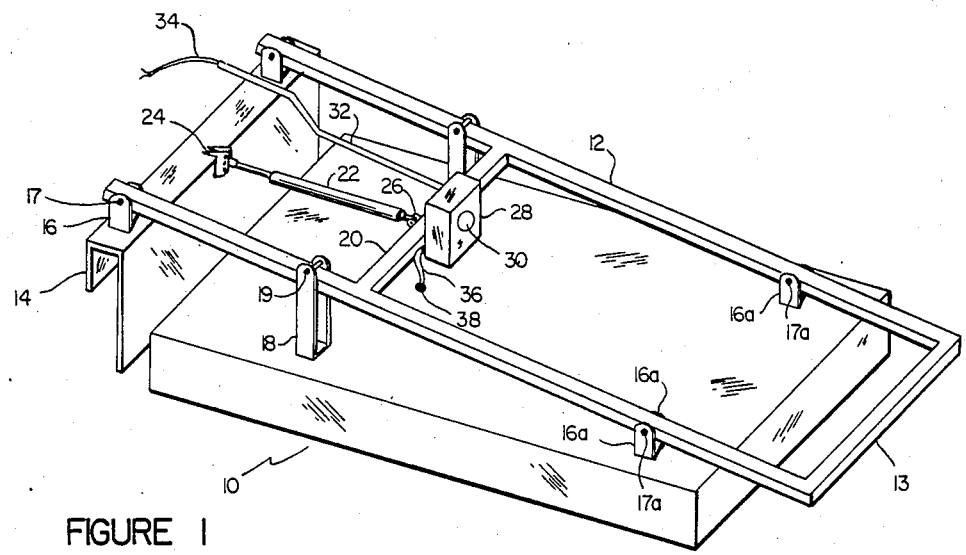
FIG. 1 is a perspective view of a top grill assembly constructed in accordance with the invention.

While the top grill assembly illustrated in FIG. 1 will be described, it may be helpful to refer also to FIGS. 2, 3 and 4 to facilitate an understanding of the invention. A top grill 10 is generally rectangular in configuration and has a substantial thickness. The top grill is preferably constructed of metal, has a polished cooking surface on its underside and includes an electric heating element for controlling the temperature of the cooking surface. The size of the grill is dependent upon its intended use. For conventional fast food use, the grill may be on the order of 10" wide and 24" long, which is suitable for covering approximately one half of a conventional freestanding cooking grill surface. When installed on such a conventional grill, one half of the lower grill surface remains available for "single sided" cooking while the other half may be used for "grill press" cooking, that is two sided cooking.

A generally elongated U-shaped handle 12 having a grip 13 at the closed end of the "U" is provided for raising and lowering top grill 10. A support bracket 14 having a "J" cross section extends along the rear of the grill assembly and includes two U-shaped pivot supports 16, each of which is fixed to the upper surface of support bracket 14 by any well known means, preferably by being welded thereto. Handle 12 may be of tubular construction and as shown is of tubular construction with a square cross section. Pivot supports 16 are spaced apart a distance equal to the spacing between the legs of handle 12. The legs of handle 12 are pivotally mounted in U-shaped supports 16 by pivot pins 17 which extend through the pivot supports and the legs of handle 12. Handle 12 is therefore pivotally mounted in pivot supports 16 to enable pivotal movement with respect to support bracket 14. A similar pair of U-shaped pivot supports 16a is located near the front of top grill 10 and is mounted thereto by welding or the like. The forward leg portions of handle 12 are also pivotally mounted to the U-shaped pivot supports 16a by pivot pins 17a.

Two elongated U-shaped brackets 18 are affixed to the rear portion of the upper surface of top grill 10 and arranged to captivate the legs of handle 12 between the front and rear pivot supports 16 and 16a. This is accomplished by means of captivating pins 19 which are mounted in each captivating element 18 over the legs of handle 12. The rear portion of top grill 10 is capable of moving through an arc determined by the height of the captivating element 18. As will be described, this feature enables the top grill to adjust for different thicknesses of foods on the front and rear of the grill.

A cross member 20 extends between the two legs of handle 12 and is preferably welded thereto. Counter balancing of the top grill is accomplished by means of a gas pressure cylinder 22 which is captivated between a mounting bracket 24 on support bracket 14 and mounting bracket 26 on cross member 20. As will be explained, the pressure exerted by top grill 10, when in the cooking position, may be readily adjusted by changing the attachment location of the gas cylinder.

A thermostat housing 28 is mounted to cross member 20 and includes a knob 30 for adjusting the temperature of top grill 10. A tubular cord guide 32 is attached to the cross member and acts as a guide for a line cord 34 that brings electrical power to a thermostat and heating element (neither of which is illustrated).

Figure 2:
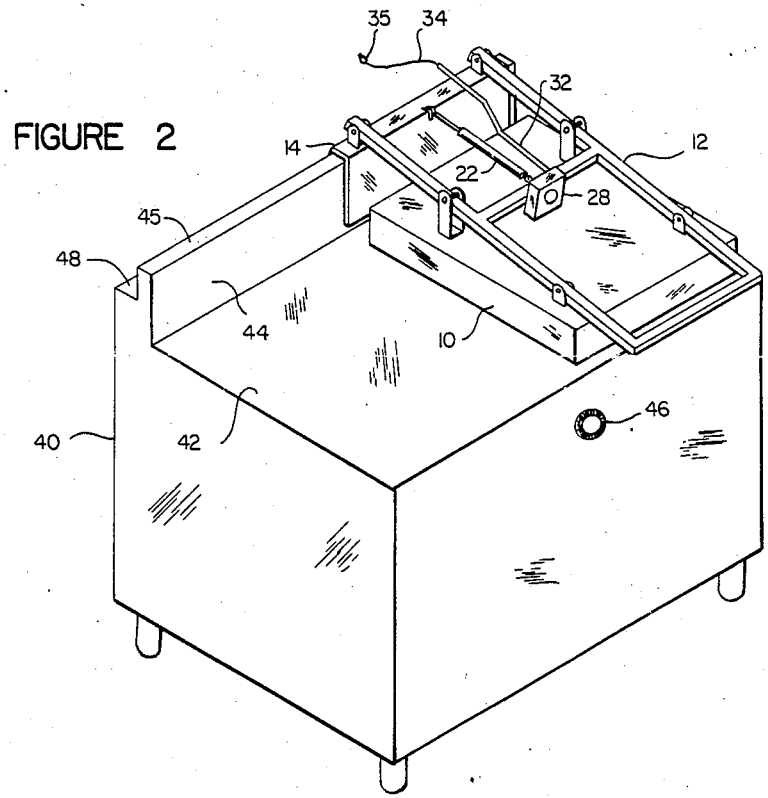
FIG. 2 is a perspective view showing the top grill assembly of the invention in position on a conventional cooking grill apparatus.

As more clearly shown in FIGS. 2 and 3, the top grill assembly of the invention conveniently fits over the back 44 of an enclosure 40 for a conventional cooking grill apparatus. The cooking apparatus includes a grill surface 42 and a thermostat control 46. For a gas heated cooking grill, a flue 48 is generally provided at the rear of the enclosure for channeling away the products of combustion. In an electrically operated grill, a flue 48 would not be required. In either unit however, the back 44 has a horizontally disposed ledge portion 45 that is approximately 1" in width. The support bracket 14 illustrated for the top grill assembly of the invention is adapted to fit over back 44 and ledge 45 without requiring the use of any tools. While the support bracket and ledge illustrated are for cooking grills manufactured by Keating of Chicago, Inc. it will be appreciated that the support bracket may be adapted for use with support ledges having differing dimensions. The weight of the top grill assembly is approximately 40 lbs. and consequently support bracket 14 holds the assembly very securely to back 44 of the enclosure. The grip portion 13 of the handle extends beyond enclosure 40 to enable the operator to open and close the grill with ease. The top grill is raised and lowered by pivoting of the legs of handle 12 in the rear pivot supports 16 attached to support bracket 14. It will further be appreciated, that the provision of cord guide 32 assures that cord 34 is kept clear of provision of cord guide 32 assures that cord 34 is kept clear of interfering structures during opening, closing and operation of the top grill. As will be seen, the cord guide is supported on cross member 20 by means of a U-shaped spring. A heater cord 36 extends from the thermostat housing 28 to a heater element (not shown) in top grill 10 by means of a grommet 38. As illustrated, patties of food 50 are sandwiched between the lower surface of top grill 10 and the grill surface 42. It will be further appreciated, that the temperatures of the individual heating surfaces are adjustable. It has been found that operating the top grill cooking surface at about 30° F.–40° F. higher than the bottom grill cooking surface provides excellent results in cooking frozen hamburger and sausage patties. Indeed such foods (of conventional thickness) may be fully cooked from a frozen state in approximately 1½ minutes.

Figure 5:
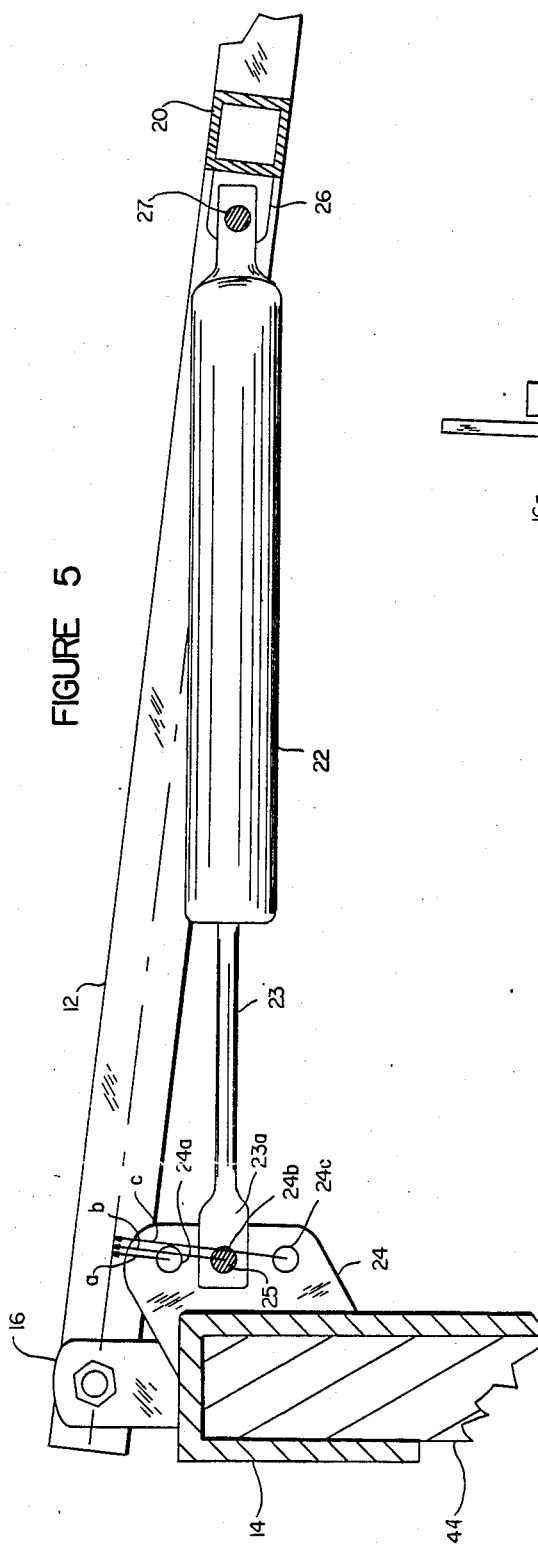
FIG. 5 is an enlarged partial view showing the arrangement of the hinge and gas cylinder of the top grill assembly of the invention.

With particular reference to FIG. 5, gas pressure cylinder 22, which has axially extending arms 23 terminating in flattened portions 23a, is shown mounted between mounting brackets 24 and 26. Portions are shown in section for clarity. Mounting bracket 26 may be a U-shaped element that is welded to cross member 20 (illustrated as having a hollow square cross section). A mounting pin 27 secures flattened portion 23a of one of the arms 23 between the sides of U-shaped mounting bracket 26. The other flattened portion 23a of the other of the arms 23 may be mounted by a mounting pin 25 in any of three holes 24a, 24b and 24c in mounting bracket 24 which may also be generally U-shaped. As indicated by the arrows a, b and c, the force component tending to lift handle 12 increases as the distance of the mounting hole below pivot pin 17 in U-shaped pivot support 16 increases. Since gas cylinder 22 is a pressure cylinder, its arms 23 are biased toward their outermost positions. Thus if a change in location of mounting pin 25 is desired, the cylinder is placed in its most extended position which corresponds to the top grill assembly being in its most vertical position. In that position, the mounting pin 25 my be readily removed and repositioned to change the lifting force exerted by cylinder 22 when top grill 10 is in its horizontal or working position. Thus the pressure exerted by the grill on the foods may be readily changed in the field.

Figure 6:
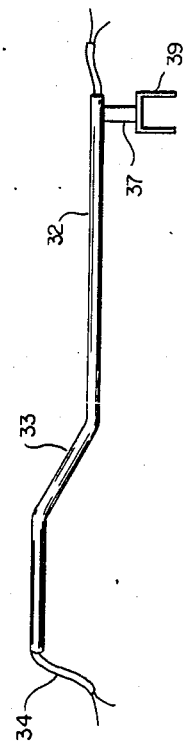
FIG. 6 is a view of the cord guide useful in connection with the top grill assembly of the invention.

In FIG. 6 cord guide 32, which is preferably tubular in construction, is shown with an offset at 33 to provide clearance at the rear of the top grill assembly. A support leg 37 is affixed near the front of the cord guide, preferably by welding or brazing thereto, and extends into a U-shaped spring clip arrangement 39 which is adapted to firmly grasp the square cross member 20. Thus the cord guide may be conveniently held in position for keeping cord 34 out of harms way. Other techniques for mounting the cord guide to the top grill assembly may also be utilized.

Figure 7:
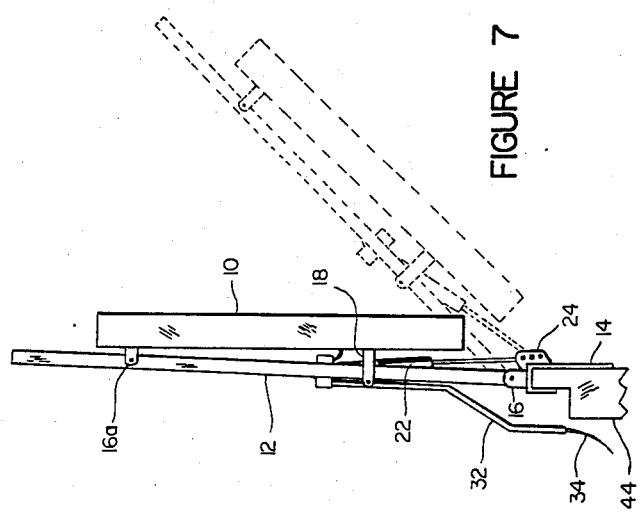
FIG. 7 is a partial view illustrating the upright and intermediate position of the top grill assembly of the invention.

In FIG. 7, the top grill assembly is shown in its uppermost position and, by means of dotted lines, in an intermediate position. In particular, it should be noted that in the uppermost position, the handle 12 is not in contact with the pins 19 in the U-shaped captivating elements 18.

While an improved top grill assembly of specific configuration has been described, it is recognized that numerous changes and modifications therein will be readily apparent to those skilled in the art without departing from the true spirit and scope of the invention. The invention is to be limited only as defined in the claims.

What is claimed is:

1. A top grill assembly comprising:
   U-shaped support means adapted for removable attachment to the rear housing of a cooking grill without the use of fasteners;
   a top grill;
   a supporting handle;
   mounting means pivotally mounting said supporting handle to said top grill near the forward end of said top grill;
   captivating means permitting limited angular movement between said supporting handle and said top grill near the rearward end thereof;
   wherein said mounting means and said captivating means comprise U-shaped brackets affixed to the surface of said top grill and wherein said supporting handle has a generally U-shaped configuration with a pair of elongated legs, said legs being pivotally mounted to said support means at their open ends and pivotally mounted to said mounting means near their closed ends; and
   gas cylinder means coupled between said support means and said supporting handle for substantially offsetting the weight of said top grill.

2. The assembly of claim 1 further comprising a mounting bracket affixed to one of said support means and said supporting handle for attachment to one end of said gas cylinder, said mounting bracket including a plurality of displaced mounting positions for said gas cylinder for affecting the force applied to said top grill when in a cooking position.

3. The assembly of claim 2 further including thermostat means mounted to said assembly and a cord guide affixed to said supporting handle for supporting an electrical cord for said thermostat means.

* * * * *